United States Patent [19]
Kris

[11] Patent Number: 4,771,380
[45] Date of Patent: Sep. 13, 1988

[54] VIRTUAL VECTOR REGISTERS FOR VECTOR PROCESSING SYSTEM

[75] Inventor: Thomas A. Kris, Sandy Hook, Conn.

[73] Assignee: International Business Machines Corp., Armonk, N.Y.

[21] Appl. No.: 623,602

[22] Filed: Jun. 22, 1984

[51] Int. Cl.[4] ............................................. G06F 13/00
[52] U.S. Cl. ..................................................... 364/200
[58] Field of Search ... 364/200 MS File, 900 MS File, 364/736

[56] References Cited

U.S. PATENT DOCUMENTS

| | | | |
|---|---|---|---|
| 4,041,461 | 8/1977 | Kratz et al. | 364/200 |
| 4,128,880 | 12/1978 | Gray, Jr. | 364/200 |
| 4,149,243 | 4/1979 | Wallis | 364/200 |
| 4,172,287 | 10/1979 | Kawabe et al. | 364/736 |
| 4,371,927 | 2/1983 | Wilhite et al. | 364/200 |
| 4,594,682 | 6/1986 | Drimak | 364/200 |
| 4,661,900 | 4/1987 | Chen et al. | 364/200 |

OTHER PUBLICATIONS

IBM Field Engineering Theory of Operation Manual, 2938 Array Processor, Model 1, RPQW24563, Model 2, RPQ815188, 1969.
GA24-3639-1, IBM 3838 Array Processor Functional Characteristics, 1976, '77, '78, '81.

*Primary Examiner*—Gary V. Harkcom
*Assistant Examiner*—C. H. Lynt
*Attorney, Agent, or Firm*—D. R. McKechnie

[57] ABSTRACT

A data processing system has a working or buffer store connected between a main or bulk store and a vector processing unit. The buffer store contains one or more vitual vector registers operable under user control in register-to-register vector operations. A user instruction specifies the length of a vector operand to be processed, the type of operation to be performed, and which vector registers will be used. Vector processing is controlled by a series of programs defined at the code level of the processing unit where for a given function or operation, the same program is used for both register-to-register and storage-to-storage processing. The latter processing is controlled by passing predetermined parameters to the program whereas register-to-register processing is controlled by passing parameters generated in response to user program instructions.

4 Claims, 5 Drawing Sheets

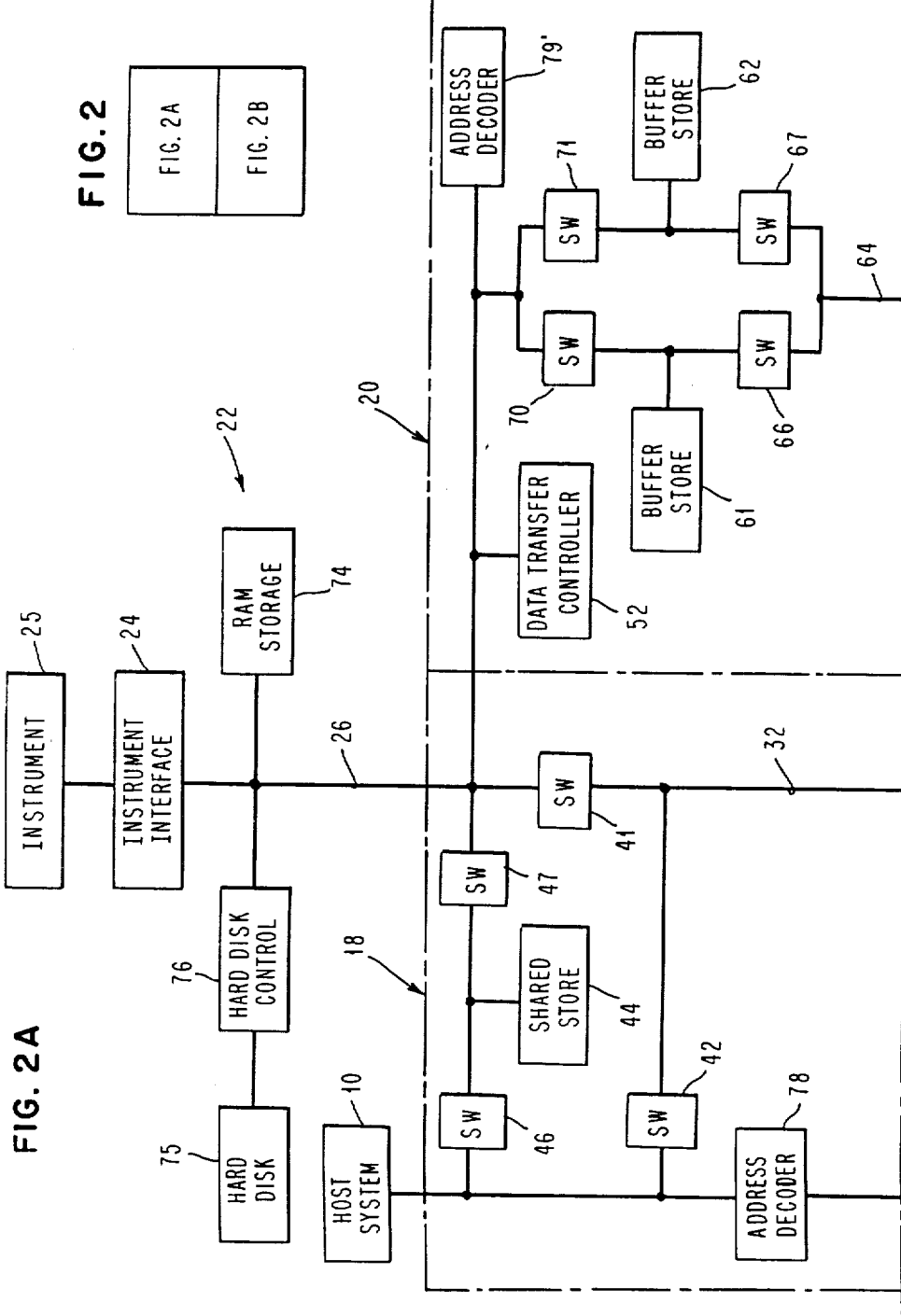

VIRTUAL VECTOR REGISTERS FOR VECTOR PROCESSING SYSTEM

This invention relates to array or vector processing systems and, more particularly, to improvements therein providing a plurality of virtual vector registers allowing user control over register-to-register processing of vector operands.

BACKGROUND OF THE INVENTION

Vector processing is a well known form of data processing involving arrays or vector operands. The terms "array" and "vector" are synonymous and are used in a mutually interchangeable manner hereinafter. A "vector operand" is a set of ordered or related data items or vector elements. "Vector processing" generally involves performing the same operation on each element of the vector operand. In one common prior art method of vector processing, vector operands are stored in a main store or bulk store. Execution of a user instruction causes a storage-to-storage operation to be performed wherein one or more vector operands are inputted from the main or bulk store into a processing unit and the results of processing are then stored back in the main or bulk store.

Because the speed of operation of a processing unit is generally considerably faster than the speed of data transfer to and from a main or bulk store, a high speed buffer or cache may be connected between the bulk store and the processing unit. The operation of such buffer is normally transparent to the user during storage-to-storage operations. That is, the operations are performed automatically and the user has no control over usage of the buffer. Such control is normally accomplished by use of a microprogram and is predetermined for each of the different vector processing operations in a given system.

The IBM 3838 Array Processor had, and U.S. Pat. Nos. 4,041,461—Kratz et al and 4,149,243 Wallis, both assigned to the Assignee of the present invention, describe, an architecture in which a buffer called a "working store" is connected between a processing unit and a main or bulk store. Such working store includes two sections operable in an overlapped fashion whereby as one section works with a processing unit to input operands into the unit and to receive the processing results, the other section works with the bulk store to output results from prior processing and to receive new operands to be processed at the conclusion of the current processing. A storage controller controls the transfer of data between the working store and the bulk store. From the user viewpoint, all operations are storage-to-storage and the operation of the working store is transparent to the user.

The above architectures were oriented to processing relatively long vector operands such as might be encountered in signal analysis and processing seismic signals, where an average size vector operand has 1500 to 2000 elements. For processing, each long vector operand was broken down into segments containing a lesser number of elements, e.g., 256 elements. The last segment in an operand might contain less than the total number of elements to fill a segment and was processed as a "remainder". For vector operands having a number of elements less than the number of elements in a segment, such short operands were processed in nearly the same manner as a remainder. Each segment was assigned to a fixed or predetermined area of the working store, dependent on the type of operation and how many vector operands were involved.

The use of vector registers is also known in the prior art. The IBM 2938 Array Processor included two vector registers known as the X and Y buffers. Each buffer was relatively small and held thirty-two vector elements. All vector operations were performed via storage-to-storage processing where the generally long vector operands were broken down into thirty-two element segments each of which was temporarily stored in one of the buffers as an intermediate step in the storage-to-storage processing. For example, when two vector operands were added element-by-element, one vector operand segment was stored in the X buffer and another vector operand segment was stored in the Y buffer. Pairs of elements, one from each buffer, would then be added to produce a result element that was stored back in the X buffer to overlay the original elements therein, and the resultant vector operand segment would then be transferred to main storage. The use of such vector registers was completely transparent to the user.

U.S. Pat. No. 4,128,880, Cray, discloses a general purpose data processing system having eight vector registers and related functional units which adapt the system for array processing. The vector registers each store up to sixty-four vector elements and are available for use by the user in somewhat the same manner as are general purpose registers.

SUMMARY OF THE INVENTION

One of the objects of the invention is to provide a vector processing system combining in a novel way the advantages of a working store buffer and vector registers.

Another object of the invention is to provide a vector processing system having a variable number of different size vector registers available to the user for performing register-to-register processing of vector operands.

Still another object of the invention is to provide a vector processing system having a working store used for performing both storage-to-storage and register-to-register type vector processing.

A further object is to provide user controlled register-to-register vector operations in a manner that minimizes the amount of machine level code required to additionally support storage-to-storage vector operations.

Another object is to allow a user to control buffer register-to-register vector operations where the results from one operation are stored in a vector register for use in subsequent vector operations.

A still further object is to provide a plurality of virtual vector registers which are user controlled to provide a higher degree of versatility and more functions than are available with vector registers of the prior art.

Another object is to provide a vector processing system having a plurality of virtual vector registers available for use by a user or programmer.

Still another object is to allow a user to use vector registers wherein vector operands may overlap, or operands may be of different size or length in a given operation, or where the vector operands in vector registers may be broken up into or handled as sub-vectors.

Another object is to provide a memory mapped array processing systems having a cache or buffer store which is addressable by a user to provide a plurality of high speed vector registers which the user can control to accomplish a wide variety of functions.

Briefly, certain of the above objects of the invention are achieved by providing a working or buffer store between a main or bulk store and a vector processing unit. The buffer store contains one or more virtual vector registers operable under user control. For register-to-register vector operations, the user specifies the length of a vector operand to be processed, the type of operation to be performed, and which vector registers will be used. In performing the desired operation in response to such specification, each vector operand in a vector register is inputted into the processing unit and the result vector operand is placed in a vector register for use in subsequent operations.

In accordance with another feature of the invention, the vector processing is controlled by a program defined at the code level of the processing unit where for a given function or operation, the same program is used for both register-to-register and storage-to-storage processing. The latter processing is controlled by passing predetermined parameters to the program whereas register-to-register processing is controlled by passing parameters generated in response to user program instructions.

DRAWINGS

Other objects and advantages of the invention will be apparent from the following detailed description taken in connection with the accompanying drawings wherein:

FIGS. 2, 2A and 2B are a more detailed schematic block diagram of the system of FIG. 1.

Figure 1:
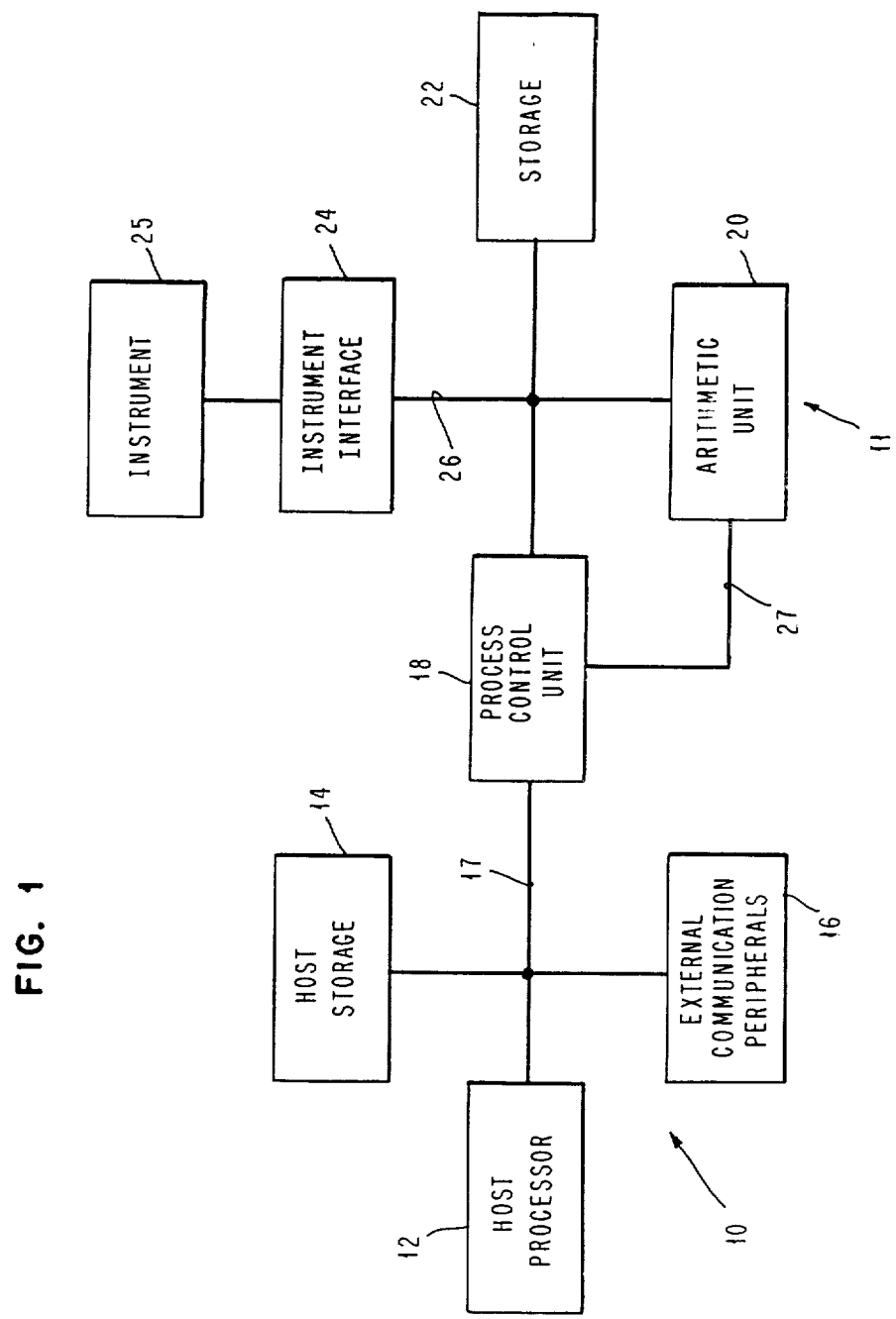
FIG. 1 is a schematic block diagram of a distributed processing system embodying the invention.

Referring now to the drawings, FIG. 1 shows a distributed processing system comprising a host system (HS) 10 and an array processing system (APS) 11. Host system 10 includes a host processor 12, host storage 14, and external communication peripherals 16 interconnected by a system bus 17. Peripherals 16 include conventional devices such as a printer, CRT display, RS 232 and IEEE 488 interfaces, etc. The host system 10 is preferably an IBM 9001 System commercially available from the Assignee of the present invention.

APS 11 includes a process control unit (PCU) 18 for controlling operation of the array processing system. APS 11 further includes a high speed arithmetic unit (AU) 20 for performing array operations, and storage 22 for storing information including array or vector operands. PCU 18 is connected to AU 20 by two buses 26 and 27. Storage 22 is also connected to bus 26. The system further optionally includes an instrument interface 24 and an instrument 25 which generate the type of data for which array operations are needed to analyze the data.

In the operation of the system thus far described, HS10 provides the overall distributed processing system control. However, relative to array operations, user or problem programs for executing or performing the array operations are executed, not in host processor 12, but in PCU 18. HS10 initiates the operations and either downloads a user or problem program into the PCU or passes a pointer to the PCU for loading a problem program from storage 22 into the PCU. This overall distributed array processing function where the array operations are carried out in APS 11, allows the host system to simultaneously perform other functions such as general housekeeping functions, monitoring operation of the instrument (except for the data gathering portion) and outputting data or results through peripherals 16. Thus, the host system does not interfere with the array operations and is able to effectively overlap control, communication, I/O, etc., functions without degrading or creating a bottleneck for the high speed flow of array operands. This explanation of the general operation of the system is intended to generally illustrate the environment in which the invention, discussed in more detail below, is utilized.

Figure 2B:
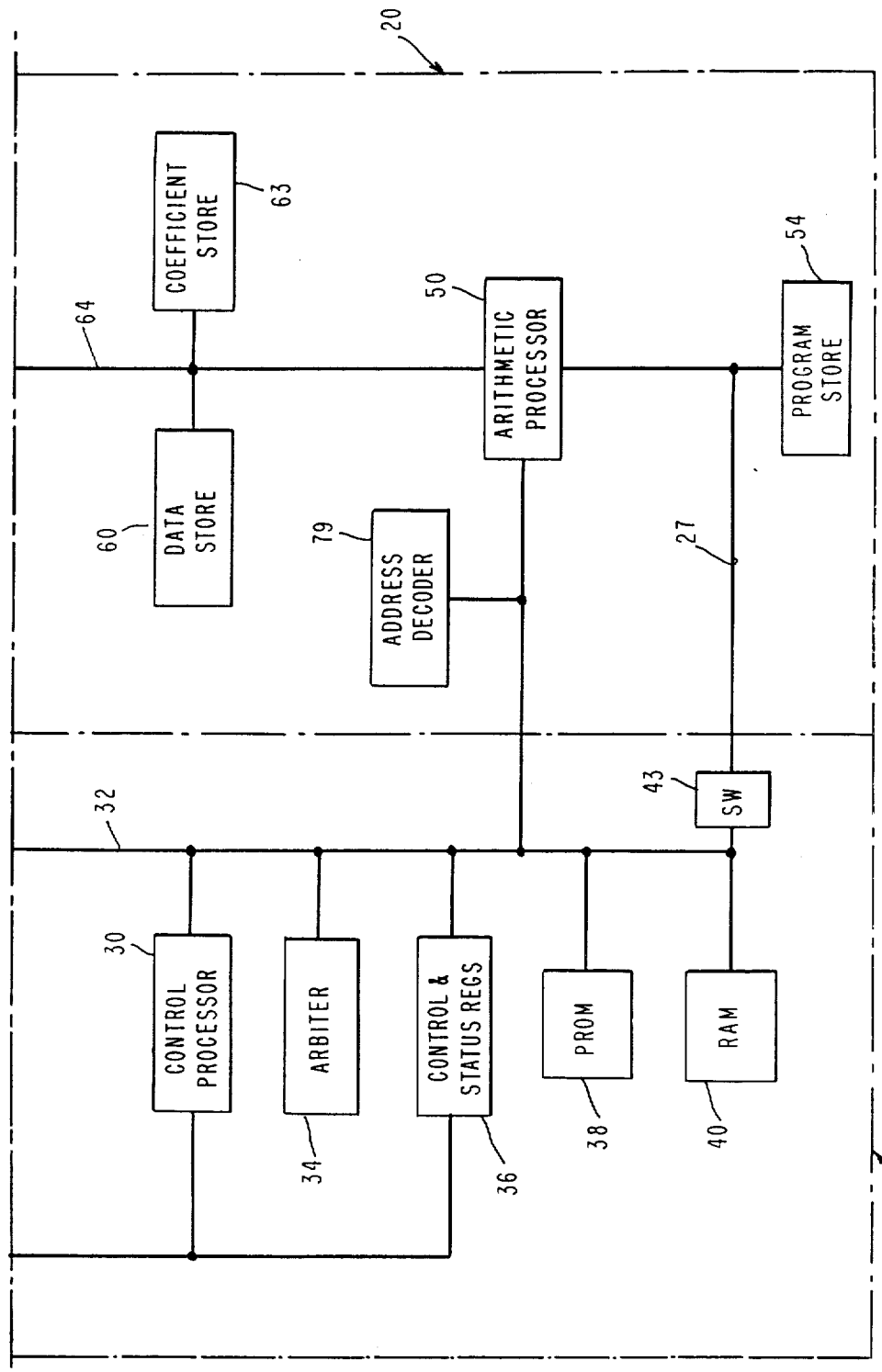

Referring now to FIGS. 2A and 2B, PCU 18 includes a control processor (CP) 30 connected by a bus 32, to an arbiter 34, a control and status register section 36, a programmable read only memory (PROM) 38, and a random access memory (RAM) 40. These hardware elements of PCU 18 are generally the same as corresponding elements of HS10, which are within the prior art and need not be described in detail. Thus, CP30 may be a Motorola MC68000 Processor. Bus 32 is connected through selectively operable re-drivers or switches (SW) 41, 42 and 43 to other buses of the system. These switches function to either electrically isolate or to electrically connect bus 32 to the other buses and elements. It is to be understood that the various buses described herein include not only data and address lines but various control lines and that the switching function occurs on the address and data lines without affecting the control lines. Switch 41 connects the bus 32 to the above-mentioned bus 26. Bus 32 is considered an internal PCU bus and bus 26 is an external one. Together busses 26 and 32 form segments of their combination, i.e. each of busses 26 and 32 are segments of a larger bus formed by the combination of the two segments.

PCU 18 further includes a high speed shared store 44 connected to a bus 45 which in turn is connected to switches 46 and 47. Switches 46 and 47 are operated by signals from either host system 10 or PCU 18 allowing data, operands, instructions etc. to be written into and/or read from store 44 by either the HS10, PCU 18 or AU20.

AU 20 includes two primary elements, an arithmetic processor (AP) 50 and a data transfer controller (DTC) 52. AP 50 is a processing unit which executes programs stored in a program store 54 which is connected by a program bus 55 to AP 50 and to switch 43. PCU 10 loads programs from RAM 40, through switch 43 and over bus 27 into store 54, for operation of AP 50. A data bus 64 is connected to AP 50 and provides the various operands and data used in performing the array operations. Data bus 64 is separate from program bus 55 to allow overlapped fetching of operands and instructions. A data store 60 and a coefficient store 63 are connected to bus 64 inboard of a pair of ping-pong, or buffer stores 61 and 62. Data store 60 is used to store intermediate results, tables, control blocks, etc., while store 63 stores various coefficients used in array operations. Stores 61 and 62 are respectively connected by switches 66 and 67 to data bus 64 and are respectively connected by switches 70 and 71 to bus 26. Under the control of DTC 52 and AP 50, switches 66, 67, 70 and 71 are selectively actuated so that while one of stores 61 and 62 is working with AP 50, the other store is working with storage 22 under the control of DTC 50. Storage 22 is shown in more detail in FIG. 2, than in FIG. 1, as comprising a RAM storage 74 and a hard disk 75 connected through a hard disk control 76 to bus 26. APS 11 is a memory mapped system in which the various elements are selected according to their addresses. To this end, address decoders 78, 79' and 79 are provided in PCU 18 and AU 20.

In the operation of the system as thus far described, array or vector operands are stored in storage 22. Such operands can come from data derived from instrument 25, from the host system or from previous operations. HS10 initiates array operations by either down-loading a problem or user program into PCU 18 or by passing to RAM 40 a pointer indicating where the user program is located in storage 22. Once the array operations are initiated, the host system is free to perform other operations, such as monitoring instrument 25, displaying data, outputting data into a printer or CRT or via communication lines to some other system.

"Virtual" is used herein to connote that the vector registers exist in effect but not in actuality since the vector registers are formed in the buffer stores 60 and 61 which normally act as a cache for non-vector-register operations. In order to use the system for array processing, a user has to write a program including a series of call statements or instructions specifying the array operations involved. In general, the operations are divided into four types: storage-to-storage (SS), register-to-register (RR), storage-to-register (SR) and register-to-storage (RS) operations. The SS operations may be, for example, similar to the array operations provided in the aforementioned IBM 3838 Array Processor, wherein one or more vector operands stored in the main or bulk store are serially inputted into the working store, and acted on by a processing unit to produce results which are then transferred thru the working store and stored in the main store. RR operations involve the same processing but the source of an input vector is a vector register and the output or result is placed in a vector register, in a manner more fully described below. SR operations allow a vector operand to be inputted from the main store into a vector register and RS operations allow a vector operand to be outputted from a vector register into main store. The use of the working store is transparent to the user during SS operations whereas it is controlled by the user in the other operations.

The various vector operations are defined by a set of macro instructions or definitions contained in the user program. As an example of the macro instructions, consider a vector operation in which each element of one vector operand is added to a corresponding element of another vector operand to produce a sum that forms a corresponding element of a result vector operand. Such operation is known as an element-by-element summation. The associated macro instructions for SS and RR operations are:

| Mnemonic | Parameters |
|---|---|
| VADD | n,V1,V2,V3 |
| VADDR | n,V1,V2,V3 | where n=the number of elements in the vector operands, and Vx is a vector identifier of the respective vector operand. Such identifier includes a symbolic address in main memory of the first element of the operand for SS operation or an identifier of the vector register for storing the vector operand for an RR operation. The identifier may also include a skip or increment value for creating a vector operand from a base array.

Figure 3:
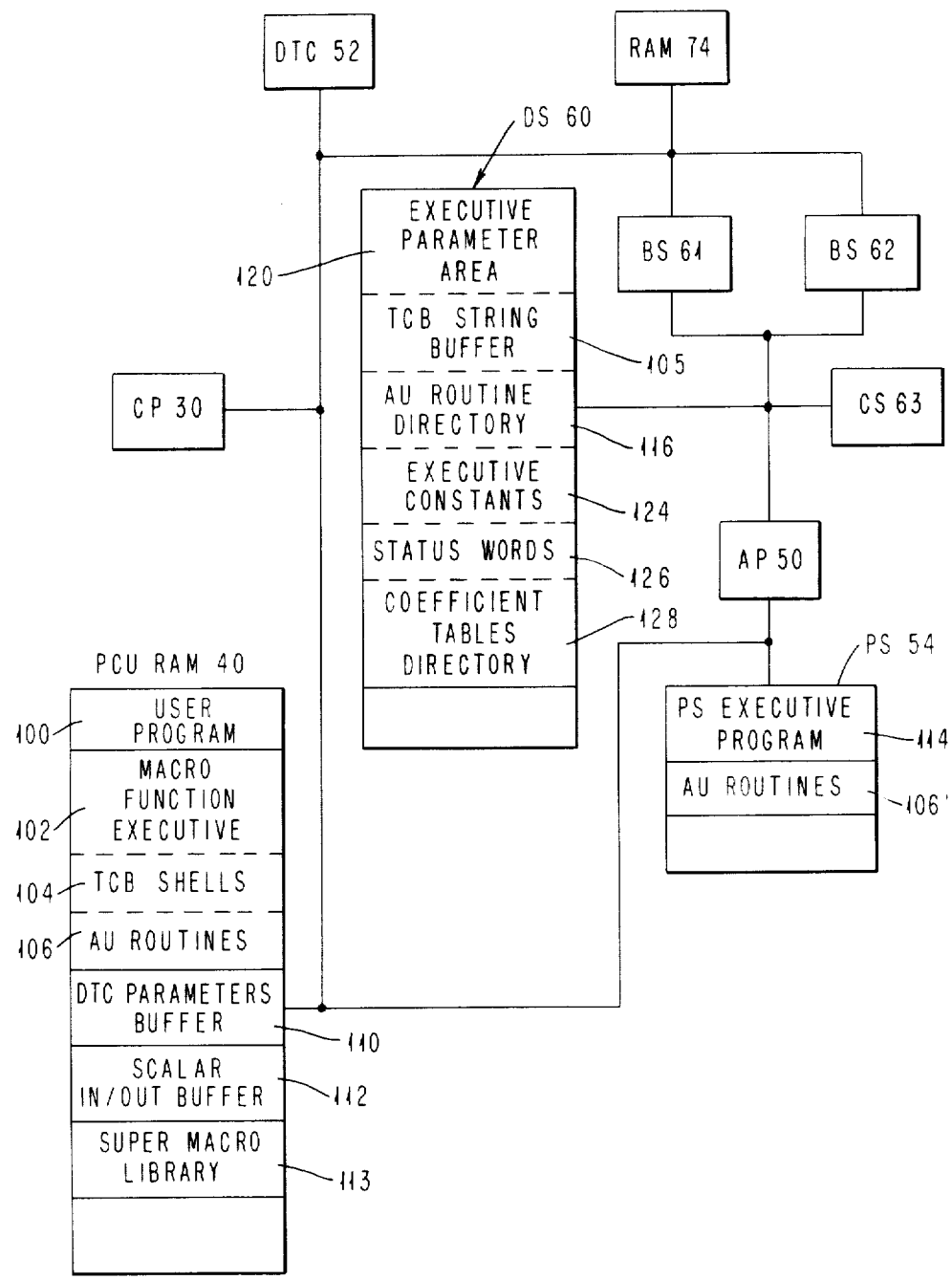
FIGS. 3–5 are schematic diagrams illustrating various operations of the system embodying the invention.

Referring now to FIG. 3, the user program 100 is stored in PCU RAM 40 and contains the various call statements or macros specifying the array operations to be performed. The mnemonic associated with each call statement represents the name of an entry point into a macro function executive program 102, which program is also stored in RAM 40. Program 102 is linked to the user program at compile time. In response to the calls in user program 100, executive program 102 formats appropriate control block parameters to support execution of the array operation, updates any coefficient tables and AU routines to support execution, and initiates transfer of input operand and control block information to AU 20, execution of the array operation and storage of generated results. Program 102 contains task control block (TCB) shells 104 and AU routines 106. RAM 40 also contains a DTC parameter buffer 110 into which program 102 places information for use by DTC 52 in controlling the transfer of information into and out of AU 20. A scalar in/out buffer 112 in RAM 40 stores scalar information used in array operations. For each array operation to be performed or executed, executive program 102 contains the specific routines and information which are developed in response to the user parameters associated with the macros in the user program, to execute the specific array operation.

The specific AU routines 106' required to execute a specific function are loaded into program store 54 beginning at a location the address of which is stored in an AU routine directory 116 stored in data store 60. An AU executive program 114 is initially stored in store 54 and controls operation of AP 50. When program 114 is loaded, AP 50 is placed in a loop or idle state. In response to a macro instruction in the user program, a specific TCB is loaded into a TCB string buffer 105 in data store 60. AP 50 is forced to a reset state upon such a loading of a TCB. Upon release of the reset state, AU executive program 114 takes control of the processing to initiate and execute the specific array operation defined by a TCB. All I/O activity external to APS 20 required to support TCB execution is administered by the macro function executive program 102.

Data store 60 has an executive parameter area 120 containing buffer 105 and directory 116. Area 120 is a region strictly reserved for use by executive program 114 and routines 106'. In addition, area 120 stores executive constants 124 as a utility source of commonly used coefficients, a directory 128 of pointers to coefficient tables, and status words 126 which define the processing state, executive code pointers and arithmetic routine user parameters.

Figure 4:
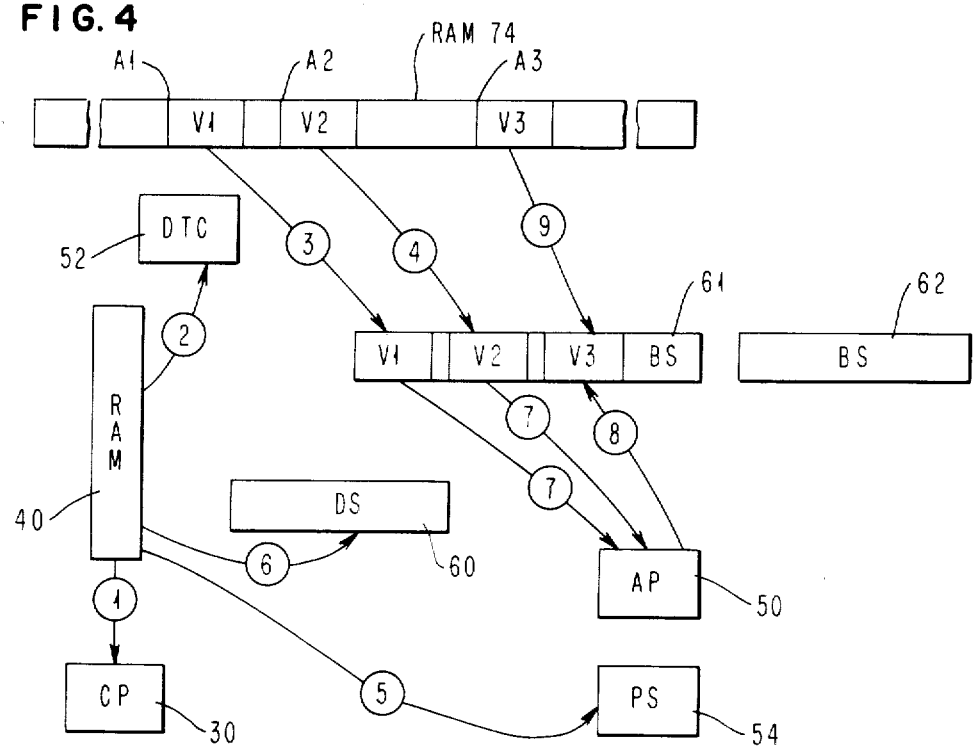
Figure 5:
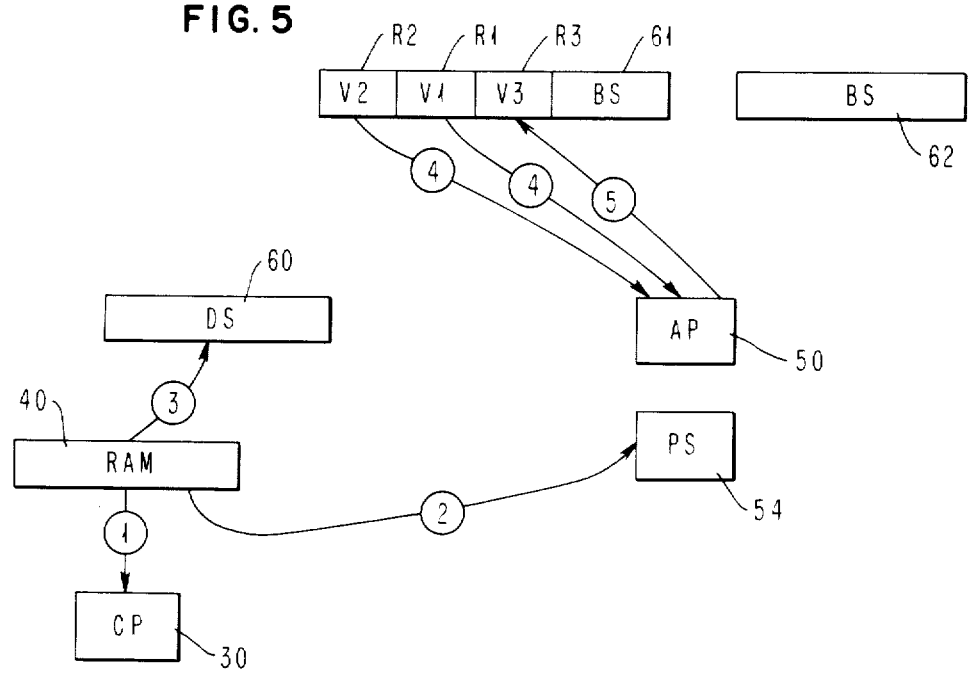

FIGS. 4 and 5 are schematic diagrams illustrating the flow of information for exemplary SS and RR operations associated with the same exemplary macro for performing element-by-element summations. The various flow lines are identified by numerals enclosed by circles associated with the line. Each step or flow line can be identified specifically by specifying the FIG. number followed by the step number. For example, step 4-6 refers to the flow line going from RAM 40 to DS 60 in FIG. 4. Within the illustrative example, two 800 element vector operands V1 and V2 are added element-by-element to produce a 800 element vector operand V3. For an SS operation, the macro is defined as follows:

VADD 800, A1, A2, A3 where A1-A3 represent the symbolic addresses in RAM 74 of the first address or element of each vector operand.

As a preliminary step, it is necessary to store vector operands V1 and V2 in RAM 74 at the starting addresses A1 and A2. In step 4-1, when the above-macro instruction is encountered in the user program by CP 30, the macro function executive program in RAM 40 is entered at the point corresponding to the specific macro to initiate the various steps associated with this array operation. One of the first steps is for the executive program to decide which of buffer store 61 or 62 is to receive the vectors. Once this is decided, then the next decision is whether or not such buffer is available or if it has to be unloaded before being able to be used for the present operation. Assuming in the specific situation illustrated that BS 61 is the one chosen for use, then when such buffer store becomes available, step 4-2 transfers the necessary information from the DTC parameter buffer 110 in RAM 40 (FIG. 3) to DTC 52. Step 4-3 causes vector V1 to be transferred beginning at the starting address A1 into BS 61 beginning at starting address 0, until all 800 elements have been transferred therein. Step 4-4 transfers vector V2 from its location beginning at address A2 and RAM 74 into BS 61 beginning at address 1024 therein. For this particular macro instruction, the buffer stores are divided into three areas, beginning at addresses 0, 1024 and 2048 to receive vector operands of up to 1024 elements therein. The starting addresses are preassigned therein and do not vary for this particular macro.

Once the vector operands have been stored in BS 61, and AP 50 becomes available for use, step 4-5 transfers the associated AU routines into TS 54 and a TCB shell is transferred by step 4-6 into the TCB string buffer of DS 60. This TCB shell contains the values shown in Table 1, assuming that no increment value is used in the operation. Step 4-7 involves inputting two corresponding elements from each of the vector operands V1 and V2 as stored in BS 61 into AP 50 where the elements are added together to perform a result element. Step 4-8 then transfers the result element into BS 61 as an element of the vector operand. Steps 7 and 8 are performed 800 times on a pipeline basis until all of the elements of the vector operands have been processed. Once this has completed, AP 50 is released from use by this operation and DTC 52 then causes step 4-9 to transfer the result vector and store it into the vector operand area V3 beginning at symbolic address A3 of RAM 74, to complete the operation.

TABLE 1

| TCB(VADD) field | |
|---|---|
| 1 | L = length of TCB |
| 2 | ID = op code |
| 3 | 0-offset address in buffer store of first element of first vector operand |
| 4 | 1024-offset address in buffer store of first element of second vector operand |
| 5 | 2048-offset address in buffer store of first element of result vector operand |

As a preliminary step prior to the execution of the macro instruction VADDR, vector operands V1 and V2 are loaded in BS 61 in virtual vector registers R1 and R2. The particular example chosen is that R1 and R2 are defined by equate statements to begin at addresses 800 and 0 respectively in BS 61. Such addresses provide that the vector operands are contiguous one another and are in a reverse order from that discussed above relative to FIG. 4. In this regard, it is to be noted that the user has complete control over which buffer store 61 or 62 is being used and where in the respective buffer the register or vector register will exist. In step 5-1, CP 30 encounters the macro instruction and initiates step 5-2 which causes the appropriate AU routine to be placed in PS 54, if it is not already there. Step 5-3 transfers the TCB shell to the TCB string buffer of DS 60 where the shell fields are located with the values shown in Table 2. Control is then transferred to AP 50 which in step 5-4 causes the respective operand elements from vector operands V1 and V2 to be transferred or inputted into AP 50 which thereupon produces by step 5-5 the vector operand elements of V3 which are then stored in virtual vector register R3. Once all 800 elements have been processed, the operation is complete.

TABLE 2

| TCB(VADDR) field | |
|---|---|
| 1 | L = length of TCB |
| 2 | ID = op code |
| 3 | 800-offset address of vector register R1 in buffer store |
| 4 | 0-offset address of vector register R2 |
| 5 | 1600-offset address of vector register R3 |

The AU routine used for both the SS operation and the RR operation is the same. The difference between the two types of operation is that the TCB shell for the SS operation normally contains the predetermined starting addresses of where the respective elements of the vector operands will be placed in the buffer store. These starting addresses do not vary for each particular macro. In contrast, these addresses which ocour respectively in fields 3-5 are overwritten for the RR operation with the respective starting addresses of the various vector registers which are predefined by the user and provide the user with complete control of the use of the buffer stores. In contrasting the differences between RR and SS operations, the principal difference is that operand references in RR macros refer to storage locations located within AU 20, as opposed to external locations and therefore no DTC I/O transfer activity occurs during the course of executing an RR macro. Additionally, RR macro TCBs may be strung together to form a single large multi-statement TCB to initiate execution of the macro in the AU 20 as part of a super macro whereas SS macros are always individually executed. Direct selection of the AU buffer store is defined by the RR macro whereas the executive program makes the selection for SS macros.

One big advantage of the use of the RR macros is the great flexibility provided to the user for creating additional functions not provided by the primitive macro set that would normally be provided with a machine. This allows the user then to formulate sets of super macros for carrying out user defined functions. Also, the output from previous array processing can be used as the input for additional processing. For instance, in connection with the above described element-by-element summation, once vector V3 is created, it can be used in subsequent macro or array operations.

To more fully illustrate the versatility of the use of the RR operations and the ability of user to define additional functions, the following example is a small field on a large field correlation using a five element reference field being correlated with a 1024 element data field. The mathematics of the analysis is expressed in accordance with the following equation:

$$Z_j = \sum_{i=0}^{4} X_{i+j} E_i \qquad \text{(Eqn. 1)}$$

$Z_j$ represents the j element of the result vector operand Z where j varies from 0 to 1019.
X is an element of the large data field.
E is an element of the reference field.

In general, each element of the Z vector operand is formed by multiplying five consecutive elements of the data field by the five elements of the reference field, and then summing the five products to form the Z vector element. The general manner in which the correlation analysis is performed is for the user to create a super macro that is stored in the super macro library 113 in RAM 40. The super macro is invoked by a label placed in the user program 100. In the example being described, it is assumed that the label used in connection with a correlation analysis is CORR. As part of the macro creation process, the user must define the virtual vector registers being used since the user has total control over which of the buffer stores 61 or 62 is going to contain the registers and within a given buffer store, where the registers will be located and their respective sizes. The following Table 3 defines these registers through the use of four equate statements using the system hex address corresponding to the system address of buffer store 61:

TABLE 3

| Statement Number | Register Definitions | | Hex Address |
|---|---|---|---|
| | Register | | |
| (1) | R0 | EQ | F90,000 |
| (2) | R1 | EQ | F90,004 |
| (3) | R2 | EQ | F90,404 |
| (4) | R3 | EQ | F90,804 |

From the above, register R0 will hold five reference elements, register R1 will hold 1024 data elements, register R3 has a size of 1024 spaces but will hold 1020 result elements, and register R3 will hold a five element intermediate vector operand.

The various macro definitions used in the super macro identified by the label CORR is shown in the following Table 4:

TABLE 4

| | Label: CORR | |
|---|---|---|
| MACRO # | MNEMONIC | PARAMETERS |
| 1 | AULD | (5,R0,REF) |
| 2 | AULD | (1024,R1,DATA) |
| 3 | VMULR | (5,R0,R1,R3) |
| 4 | SSUMR | (5,R3,R2) |
| 5 | BRCHR | (1020,2,2,2,1,1,2,1) |
| 6 | AUST | (1020,R2,RESULT) |

As a preliminary to invoking this super macro CORR, the five reference values will be stored in RAM 74 at a symbolic address beginning at REF and 1024 data elements will be stored in RAM 74 at a symbolic address beginning at DATA. Macro #1 is an SR type load instruction which causes five reference elements from the main store at REF to be stored in virtual vector register R0. This would load the reference values into buffer store 61. When macro #1 is initially encountered, macro function executive program 102 completes prior operations, such as unloading BS61, and then turns over control of the use of the buffer stores, to the user program. Macro #2 is a similar instruction for loading 1024 elements from memory address DATA into vector register R1. Macro #3 is a vector element-by-element multiply indicating that five elements from vector registers R0 and R1 are to be respectively multiplied and the five products stored in vector register R3. Macro #4 is a vector sum process by which the five elements stored in vector register 3 are added together to form a single scalar value for these five elements that is stored in one of the positions in register R2. On the first pass thru these macro definitions, this results in forming the first element of vector Z in (Eqn. 1) above. Macro #5 is the controlling macro which is going to cause a loop through macros 3, 4 and 5, 1019 more times in order to complete the calculation of the result vector Z. Macro #5 is a branch macro in which the respective parameters have the following values:

| (1) | 1019 | loop count-go thru loop 1019 mores times; |
| (2) | 2 | branch back two TCB's (to one associated with macro #3); |
| (3) | 2 | modify TCB two back by |
| (4) | 2 | increment second operand (R1) pointer by |
| (5) | 1 | increment value; |
| (6) | 1 | modify TCB 1 back by |
| (7) | 2 | increment second operand (R2) pointer by |
| (8) | 1 | increment value |

As previously described, for a series of consecutive macro instructions, the associated TCB's are strung together and placed within the TCB string buffer 105. In the above description of macro #5, reference to TCB's within these macro parameters refers to the ability to branch between TCB's within the strings and modify the strings or TCB's dynamically during the course of executing the super macro instruction.

One point to be noted about this illustrative example is that the vector placed in vector register R3 resulting from execution of macro 3 is a intermediate or temporary vector register the contents of which are never stored outside of the AU 20 or outputted therefrom. The old contents of such intermediate register are overlaid each time macro #3 is executed while going through the loop. Moreover, by doing or performing the super macro instruction calculations within the vector registers, no I/O activity is involved in the sense that DTC 52 transfers data between AU 20 and storage 22. Thus, the operations are carried out at high speeds, locally relative to AP 50 where the various vector registers in the buffer store act. This type of analysis would be extremely slow using only SS operations because of the large amount of I/O activity that would be involved.

While the above examples illustrate the versatility and advantages of the invention, further ones will now be described. The use of the equate statements, as in Table 3, defines the starting address of where the first element of a vector operand is or will be stored and the specification of the number of elements of a vector operation defines the length of the associated vector operand, and hence the length of the associated vector register. The specification of the number of elements also controls the number of operations. This then allows the user to handle not only separate discrete vector operands but also to overlap them. For example, assume two vector registers are defined beginning at addresses n elements apart and that the length of vector operands is specified as greater than n. This provides an overlap of the vector registers and is useful in some vector analysis techniques such as signal processing, Fourier transform convolutions done piecewise, and matrix convolution accessing both rows and columns thereof. Vector operands can be broken up into sub-vectors or rearranged.

As indicated above, the system is a memory mapped system in which the individual buffer stores 61 and 62 have contiguous addresses. This allows the user to define a virtual vector register that begins in the lower address buffer store and extends into the other one. For example, each buffer store has a capacity of 4K elements. A user can process a single vector operand of a length up to 8K elements without having to segmentize it. A user can also define registers in both stores.

Another advantage of the invention that should be apparent to those skilled in art that by virtue of giving the user control over the use of buffer store 61 and 62 by creating vector registers therein, the user should also be able to process much longer vector operands that are stored in storage 22 by breaking down such operands into segments and then performing the vector register-to-register type of operations upon the segments. This broadens the capability and versatility available to the user.

It should be apparent to those skilled in the art that many modifications and changes can be made in this described embodiment without departing from the spirit and scope of the invention as represented in the attached claims.

Having thus described my invention, what I claim as new and desire to secure by Letters Patent is:

1. In a data processing system comprising a main store; a processing unit; a working store comprising a pair of buffer stores connected between said main store and said processing unit, each of said buffer stores having a multiplicity of consecutively addressed storage locations, one buffer store having a storage location whose address is next to the address of a storage location in the other buffer store; and a data transfer controller connected to said main store and said buffer stores; said processing unit and said data transfer controller selectively operating to concurrently transfer vector operands between one of said buffer stores and said processing unit and between the other of said buffer stores and said main store, means for processing vector operands having a number of vector elements to perform both storage-to-storage (SS) vector operations and register-to-register (RR) vector operations, said means comprising:

program store means for storing a user's program including SS instructions defining SS vector operations and RR instructions defining RR vector operations, said program including at least one RR instruction specifying the number of vector elements in a first vector operand, said one RR instruction further specifying a source vector register for storing said first vector operand, said one RR instruction further specifying a destination vector register for receiving a second vector operand resulting from the RR operation defined by said one RR instruction, said vector registers being located in said buffer stores whereby one of said first and second vector operands extends across and is stored in consecutively addressed storage locations in both of said buffer stores; and control means, including said data transfer controller, connected to said main store, said processing unit and said buffer stores, said control means being responsive to a first SS instruction to automatically perform the serial operations of inputting a third vector operand from said main store into one of said buffer stores at predetermined locations therein, transferring said third vector operand from said one buffer store into said processing unit for processing, outputting a fourth vector operand from said processing unit into said one buffer store at predetermined locations therein, and outputting said fourth vector operand from said one buffer store into said main store;

said control means being further responsive to said one RR instruction to automatically input said first vector operand one vector element at a time from said source vector register into said processing unit and then outputting said second vector operand one vector element at a time from said processing unit into said destination vector register whereby both of said buffer stores are accessed while executing said one RR instruction.

2. The combination of claim 1 including:

a program store for storing routines which control operation of said processing unit, said routines including a single routine for controlling processing during both SS and RR operations;

and a data store for storing different parameters used with SS and RR operations, whereby said single routine is used for both SS and RR operations which operations differ because of the different parameters.

3. The combination of claim 2 wherein said buffer stores are addressed by a user program for RR operations, and said vector registers are located in said buffer stores at locations addressed by said user program, the addresses of said locations being parameters stored in said data store.

4. The combination of claim 3 wherein said locations are specified in the used program to begin at any location in said buffer stores, and said data store stores parameters used with SS operations whereby vector operands are stored in said buffer stores beginning at predetermined locations.

* * * * *

UNITED STATES PATENT AND TRADEMARK OFFICE
CERTIFICATE OF CORRECTION

PATENT NO. : 4,771,380
DATED : September 13, 1988
INVENTOR(S) : Thomas A. Kriz

It is certified that error appears in the above-identified patent and that said Letters Patent are hereby corrected as shown below: On the title page Please correct the spelling of the inventor from Thomas A. Kris to Thomas A. Kriz.

Signed and Sealed this

Seventeenth Day of January, 1989

Attest:

DONALD J. QUIGG

*Attesting Officer*   *Commissioner of Patents and Trademarks*